(12) United States Patent
Okuda et al.

(10) Patent No.: US 11,267,452 B2
(45) Date of Patent: Mar. 8, 2022

(54) CONTROL DEVICE OF VEHICLE

(71) Applicant: TOYOTA JIDOSHA KABUSHIKI KAISHA, Toyota (JP)

(72) Inventors: Koichi Okuda, Toyota (JP); Atsushi Tabata, Okazaki (JP); Tetsuya Kono, Okazaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 242 days.

(21) Appl. No.: 16/598,671

(22) Filed: Oct. 10, 2019

(65) Prior Publication Data
US 2020/0122710 A1    Apr. 23, 2020

(30) Foreign Application Priority Data

Oct. 17, 2018 (JP) .............................. JP2018-196219

(51) Int. Cl.
*B60W 20/12*   (2016.01)
*G05D 1/00*    (2006.01)
(Continued)

(52) U.S. Cl.
CPC .............. *B60W 20/12* (2016.01); *B60K 6/22* (2013.01); *B60W 10/06* (2013.01); *B60W 10/08* (2013.01);
(Continued)

(58) Field of Classification Search
CPC ...... B60W 20/12; B60W 30/18; B60W 10/06; B60W 10/20; B60W 10/08; B60W 2552/00; B60W 2710/20; B60W 2710/06; B60W 2710/08; B60W 2530/209; B60W 2510/244; B60W 2552/05; B60W 2556/50; B60W 20/50; B60W 50/029; B60W 10/10; B60W 20/00; G05D 1/0088; G05D 2201/0213; G05D 1/021; B60K 6/22;
(Continued)

(56) References Cited

U.S. PATENT DOCUMENTS

| 6,098,733 A * | 8/2000 | Ibaraki .................. B60L 3/0084 |
| | | 180/65.28 |
| 8,521,352 B1 | 8/2013 | Ferguson et al. |
| 2016/0090100 A1 | 3/2016 | Oyama et al. |

FOREIGN PATENT DOCUMENTS

| JP | 2000-276690 A | 10/2000 |
| JP | 2006-126107 A | 5/2006 |
| JP | 2016-068704 A | 5/2016 |

* cited by examiner

*Primary Examiner* — Brian P Sweeney
(74) *Attorney, Agent, or Firm* — Oliff PLC

(57) ABSTRACT

A control device of a vehicle includes a power source and a power transmission device, and comprises: a state determining portion determining whether a vehicle state is a state in which a running performance of the vehicle is limited; a drive torque calculating portion calculating a drive torque as a maximum drive torque which the vehicle outputs based on the vehicle state; a remaining running distance calculating portion calculating a remaining distance as a maximum distance for which the vehicle travels based on the vehicle state; a destination setting portion setting a destination of the vehicle based on the drive torque and the remaining distance; and a driving control portion providing an automatic driving control in which acceleration/deceleration and steering are automatically performed based on the destination when it is determined that the vehicle is in a state in which the running performance thereof is limited.

8 Claims, 7 Drawing Sheets

(51) Int. Cl.
*B60W 30/18* (2012.01)
*B60W 10/06* (2006.01)
*B60W 10/08* (2006.01)
*B60W 10/20* (2006.01)
*B60K 6/22* (2007.10)

(52) U.S. Cl.
CPC ............ *B60W 10/20* (2013.01); *B60W 30/18* (2013.01); *G05D 1/0088* (2013.01); *B60W 2552/00* (2020.02); *B60W 2710/06* (2013.01); *B60W 2710/08* (2013.01); *B60W 2710/20* (2013.01); *B60Y 2200/92* (2013.01); *G05D 2201/0213* (2013.01)

(58) Field of Classification Search
CPC .. B60K 2006/4825; B60K 6/48; B60K 6/365; B60K 6/547; B60K 6/445; B60Y 2200/92; Y02T 10/72; Y02T 10/62
See application file for complete search history.

| AT GEAR POSITION | C1 | C2 | B1 | B2 | F1 |
|---|---|---|---|---|---|
| 1st | ○ | | | △ | ○ |
| 2nd | ○ | | ○ | | |
| 3rd | ○ | ○ | | | |
| 4th | | ○ | ○ | | |

CONTROL DEVICE OF VEHICLE

This application claims priority from Japanese Patent Application No. 2018-196219 filed on Oct. 17, 2018, the disclosure of which is incorporated herein by reference in its entirety.

FIELD OF THE INVENTION

The present invention relates to a control device of a vehicle including a power source and a power transmission device transmitting power of the power source to drive wheels.

DESCRIPTION OF THE RELATED ART

A control device of a vehicle including a power source and a power transmission device transmitting power of the power source to drive wheels is well known. For example, this corresponds to a control device of a vehicle described in Patent Document 1. According to the disclosure of Patent Document 1, if a defect in map data is detected by comparing the map data with sensor data acquired by the vehicle during running in an automatic mode in which a vehicle is automatically accelerated/decelerated and steered for running, the running in the automatic mode is performed based on additionally acquired sensor data until running is performed in a manual mode based on a driver's driving operation, and if the running in the manual mode is not performed, the vehicle is stopped at a safe place through the running in the automatic mode.

PRIOR ART DOCUMENT

Patent Document

Patent Document 1: U.S. Pat. No. 8,521,352

SUMMARY OF THE INVENTION

Technical Problem

Running performance of a vehicle may be limited as compared to original performance due to failure of some components related to the running of the vehicle or deterioration in function of the components. In such a case, as described in Patent Document 1, it is conceivable that the vehicle is stopped at a safe place, i.e., evacuation running is performed. On the other hand, it is conceivable that a travelable road condition and a travelable distance differ depending on a state of the vehicle. The technique as disclosed in Patent Document 1 has room for improvement in evacuation running since the state of the vehicle is not taken into consideration.

The present invention was conceived in view of the situations and it is therefore an object of the present invention to provide a control device of a vehicle configured to appropriately perform evacuation running when the running performance of the vehicle is limited.

Solution to Problem

A first aspect of the present invention provides a control device of a vehicle including (a) a power source and a power transmission device transmitting a power of the power source to drive wheels, the control device comprising: (b) a state determining portion determining whether a vehicle state is a state in which a running performance of the vehicle is limited; (c) a drive torque calculating portion calculating a drive torque as a maximum drive torque which the vehicle outputs based on the vehicle state; (d) a remaining running distance calculating portion calculating a remaining distance as a maximum distance for which the vehicle travels based on the vehicle state; (e) a destination setting portion setting a destination of the vehicle based on the drive torque and the remaining distance; and (f) a driving control portion providing an automatic driving control in which acceleration/deceleration and steering are automatically performed based on the destination when it is determined that the vehicle is in a state in which the running performance thereof is limited.

A second aspect of the present invention provides the control device recited in the first aspect of the invention, wherein the power source includes an engine and a rotating machine, and wherein the driving control portion provides the automatic driving control using at least one of the engine and the rotating machine based on the vehicle state.

A third aspect of the present invention provides the control device recited in the first or second aspect of the invention, wherein the destination setting portion sets the destination based on a type of a road on which the vehicle is currently running.

A fourth aspect of the present invention provides the control device recited in the third aspect of the invention, wherein the destination setting portion sets the destination such that the vehicle runs to the destination on a road other than an expressway rather than on the expressway.

A fifth aspect of the present invention provides the control device recited in any one of the first to fourth aspects of the invention, wherein the destination setting portion sets a place having high priority as the destination among predefined prioritized places.

A sixth aspect of the present invention provides the control device recited in the fifth aspect of the invention, wherein the destination setting portion considers a predefined place for repairing the vehicle as the place having the highest priority when the destination setting portion sets the destination.

A seventh aspect of the present invention provides the control device recited in any one of the first to sixth aspects of the invention, wherein the driving control portion provides the automatic driving control by controlling the power transmission device based on a type of a road on which the vehicle is currently running.

An eighth aspect of the present invention provides the control device recited in any one of the first to sixth aspects of the invention, wherein the driving control portion provides the automatic driving control by controlling the power transmission device based on a type of a road in a route to the destination.

Advantageous Effects of Invention

According to the control device recited in the first aspect of the invention, when it is determined that the vehicle is in the state in which the running performance of the vehicle is limited, a destination for running of the vehicle is set on the basis of a drive torque that can be output based on the vehicle state and a travelable remaining distance, and an automatic driving control is provided such that acceleration/deceleration and steering are automatically performed for running based on the destination, and therefore, the evacuation running can be performed through the automatic driving to the destination at which the vehicle can arrive in the state in which the running performance thereof is limited. Therefore, when the running performance of the vehicle is limited, the evacuation running can appropriately be performed.

According to the control device recited in the second aspect of the invention, since the automatic driving control is provided by using at least one of the engine and the rotating machine based on the vehicle state, the evacuation running can be performed through the automatic driving to the destination at which the vehicle can arrive in the state in which the running performance thereof is limited.

According to the control device recited in the third aspect of the invention, since the destination is set based on the type of the road on which the vehicle is currently running, the evacuation running can be performed in consideration of running limitations on a vehicle speed etc. due to a difference in type of roads.

According to the control device recited in the fourth aspect of the invention, since the destination is set such that the vehicle runs to the destination on a road other than an expressway rather than on the expressway, the evacuation running can be performed by using a road on which running limitations on the vehicle speed etc. are hardly placed.

According to the control device recited in the fifth aspect of the invention, since a place having high priority is set as the destination among predefined prioritized places, the evacuation running can be performed toward a place having a priority set as high as possible.

According to the control device recited in the sixth aspect of the invention, since a predefined place for repairing the vehicle is considered as the place having the highest priority when the destination is set, the evacuation running can be performed in consideration of repair of the vehicle after arriving at the emergency destination.

According to the control device recited in the seventh aspect of the invention, the power transmission device is controlled based on the type of the road on which the vehicle is currently running to provide the automatic driving control, the running performance can more easily be ensured in consideration of a difference in type of the road on which the vehicle runs under the situation where the running performance of the vehicle is limited.

According to the control device recited in the eighth aspect of the invention, the power transmission device is controlled based on the type of the road on the route to the emergency destination to provide the automatic driving control, the running performance can more easily be ensured in consideration of a difference in type of the road on which the vehicle runs under the situation where the running performance of the vehicle is limited.

MODES FOR CARRYING OUT THE INVENTION

In an embodiment of the present invention, the power transmission device includes a transmission. A speed change ratio in this transmission is "a rotation speed of an input-side rotating member/a rotation speed of an output-side rotating member". The higher side of this speed change ratio is the higher vehicle speed side on which the speed change ratio becomes smaller. The lower side of the speed change ratio is the lower vehicle speed side on which the speed change ratio becomes larger. For example, the lowermost-side speed change ratio is the speed change ratio on the lowest vehicle speed side on which the vehicle speed is lowest and is the maximum speed change ratio at which the speed change ratio has the largest value.

An example of the present invention will now be described in detail with reference to the drawings.

FIRST EXAMPLE

Figure 1:
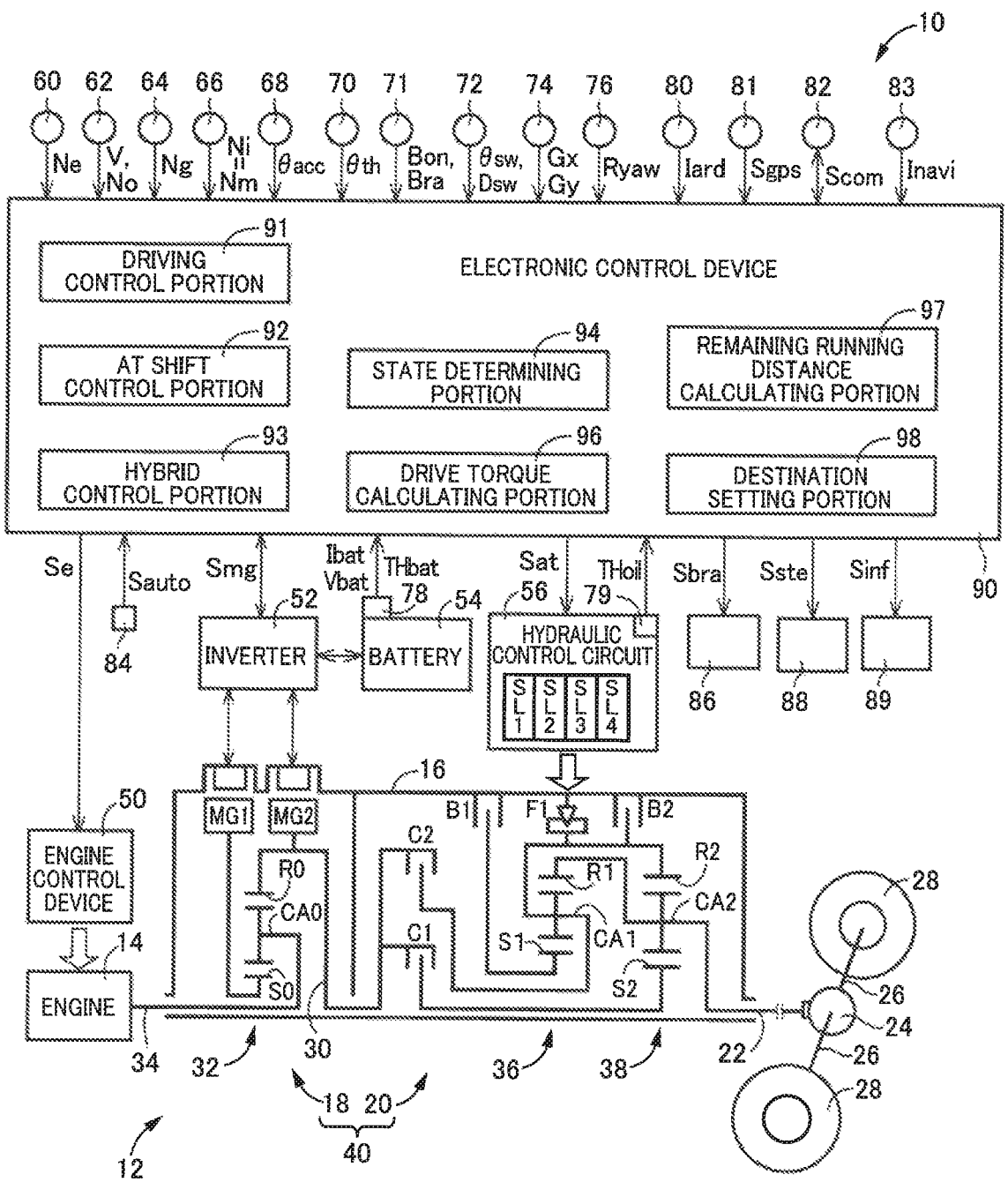
FIG. 1 is a diagram for explaining a schematic configuration of a vehicle to which the present invention is applied and is also a diagram for explaining a main portion of a control function and a control system for various controls in the vehicle.

FIG. 1 is a diagram for explaining a schematic configuration of a power transmission device 12 included in a vehicle 10 to which the present invention is applied and is also a diagram for explaining a main portion of a control system for various controls in the vehicle 10. In FIG. 1, the vehicle 10 includes an engine 14, a first rotating machine MG1, and a second rotating machine MG2. The power transmission device 12 includes an electric continuously variable transmission portion 18 and a mechanical step-variable transmission portion 20 arranged in series on a common axial center in a transmission casing 16 serving as a non-rotating member attached to a vehicle body. The electric continuously variable transmission portion 18 is coupled to the engine 14 directly or indirectly via a damper not shown and the like. The mechanical step-variable transmission portion 20 is coupled to the output side of the electric continuously variable transmission portion 18. The power transmission device 12 includes a differential gear device 24 coupled to an output shaft 22 that is an output rotating member of the mechanical step-variable transmission portion 20, a pair of axles 26 coupled to the differential gear device 24, etc. In the power transmission device 12, a power output from the engine 14 and the second rotating machine MG2 is transmitted to the mechanical step-variable transmission portion 20 and transmitted from the mechanical step-variable transmission portion 20 via the differential gear device 24 etc. to drive wheels 28 included in the vehicle 10. The transmission casing 16, the electric continuously variable transmission portion 18, and the mechanical step-variable transmission portion 20 will hereinafter be referred to as a casing 16, a continuously variable transmission portion 18, and a step-variable transmission portion 20, respectively. The term "power" is synonymous with torque or force if not particularly distinguished. The continuously variable transmission portion 18, the step-variable transmission portion 20, etc. are configured substantially symmetrically about the common axial center and have lower halves from the axial center not shown in FIG. 1. The common axial center is an axial center of a crankshaft of the engine 14, a coupling shaft 34 described later, etc.

The engine 14 functions as a power source configured to generate a drive torque and is a known internal combustion engine such as a gasoline engine and a diesel engine, for example. The engine 14 has an engine torque Te that is an output torque of the engine 14 controlled by an electronic control device 90 described later controlling an engine control device 50 such as a throttle actuator, a fuel injection device, and an ignition device included in the vehicle 10. In this example, the engine 14 is coupled to the continuously variable transmission portion 18 without via a fluid transmission device such as a torque converter and a fluid coupling.

The first rotating machine MG1 and the second rotating machine MG2 are rotating electric machines having a function of an electric motor (motor) and a function of an electric generator (generator) and are so-called motor generators. The first rotating machine MG1 and the second rotating machine MG2 are each connected to a battery 54 serving as an electric storage device disposed in the vehicle 10 via an inverter 52 disposed in the vehicle 10, and the electronic control device 90 described later controls the inverter 52 to control an MG1 torque Tg and an MG2 torque Tm that are respective output torques of the first rotating machine MG1 and the second rotating machine MG2. The output torque of each of the rotating machines is defined as a power running torque when the torque is a positive torque i.e., in the acceleration direction and is a regenerative torque when the torque is a negative torque i.e., in the deceleration direction. The battery 54 is an electric storage device giving and receiving an electric power to and from each of the first rotating machine MG1 and the second rotating machine MG2.

The continuously variable transmission portion 18 includes the first rotating machine MG1 and a differential mechanism 32 serving as a power dividing mechanism mechanically dividing the power of the engine 14 to the first rotating machine MG1 and an intermediate transmitting member 30 that is an output rotating member of the continuously variable transmission portion 18. The second rotating machine MG2 is coupled to the intermediate transmitting member 30 in a power transmittable manner. The continuously variable transmission portion 18 is an electric continuously variable transmission in which a differential state of the differential mechanism 32 is controlled by controlling an operating state of the first rotating machine MG1. The first rotating machine MG1 is a rotating machine configured to control an engine rotation speed Ne that is a rotation speed of the engine 14 and corresponds to a differential rotating machine. The second rotating machine MG2 is a rotating machine functioning as a power source configured to generate a drive torque and corresponds to a running drive rotating machine. The vehicle 10 is a hybrid vehicle including the engine 14 and the second rotating machine MG2 as a power source for running. The power transmission device 12 transmits the power of the power source to the drive wheels 28. Controlling the operating state of the first rotating machine MG1 means providing an operation control of the first rotating machine MG1.

The differential mechanism 32 is made up of a single pinion type planetary gear device and includes a sun gear S0, a carrier CA0, and a ring gear R0. The engine 14 is coupled to the carrier CA0 via the coupling shaft 34 in a power transmittable manner, the first rotating machine MG1 is coupled to the sun gear S0 in a power transmittable manner, and the second rotating machine MG2 is coupled to the ring gear R0 in a power transmittable manner. In the differential mechanism 32, the carrier CA0 functions as an input element, the sun gear S0 functions as a reaction element, and the ring gear R0 functions as an output element.

The step-variable transmission portion 20 is a mechanical transmission mechanism serving as a step-variable transmission constituting a portion of a power transmission path between the intermediate transmitting member 30 and the drive wheels 28, i.e., a mechanical transmission mechanism constituting a portion of a power transmission path between the continuously variable transmission portion 18 and the drive wheels 28. The intermediate transmitting member 30 also functions as an input rotating member of the step-variable transmission portion 20. Since the second rotating machine MG2 is coupled to the intermediate transmitting member 30 in an integrally rotating manner, or since the engine 14 is coupled to the input side of the continuously variable transmission portion 18, the step-variable transmission portion 20 is a transmission constituting a portion of a power transmission path between the power source (the second rotating machine MG2 or the engine 14) and the drive wheels 28. The intermediate transmitting member 30 is a power transmitting member for transmitting the power of the power source to the drive wheels 28. The step-variable transmission portion 20 is a known planetary gear type automatic transmission including, for example, a plurality of planetary gear devices such as a first planetary gear device 36 and a second planetary gear device 38, and a plurality of engagement devices such as a clutch C1, a clutch C2, a brake B1, and a brake B2 as well as a one-way clutch F1. The clutch C1, the clutch C2, the brake B1, and the brake B2 will hereinafter simply be referred to as engagement devices CB if they are not particularly distinguished.

The engagement devices CB are hydraulic friction engagement devices made up of multiplate or single-plate type clutches and brakes pressed by hydraulic actuators, band brakes fastened by hydraulic actuators, etc. The engagement devices CB have engagement torques Tcb that are respective torque capacities changed in accordance with engagement oil pressures PRcb for the engagement devices CB regulated by and output respectively from solenoid valves SL1 to SL4 etc. in a hydraulic control circuit 56 included in the vehicle 10, so that operation states of the engagement devices CB, i.e., an engagement state and release state thereof, are respectively switched.

In the step-variable transmission portion 20, rotating elements of the first planetary gear device 36 and the second planetary gear device 38 include those coupled to each other or coupled to the intermediate transmitting member 30, the casing 16, or the output shaft 22, directly or indirectly via the engagement devices CB and the one-way clutch F1. The rotating elements of the first planetary gear device 36 are a sun gear S1, a carrier CA1, and a ring gear R1, and the rotating elements of the second planetary gear device 38 are a sun gear S2, a carrier CA2, and a ring gear R2.

The step-variable transmission portion 20 is a step-variable transmission in which any gear position is formed out of a plurality of gear shift positions (also referred to as gear positions) different in speed change ratio (also referred to as gear ratio) γat(=AT input rotation speed Ni/output rotation speed No) in accordance with engagement of predetermined engagement devices out of the plurality of engagement devices. Therefore, in the step-variable transmission portion 20, any of the plurality of engagement devices is engaged to switch the gear position, i.e., to perform a shift. The step-variable transmission portion 20 is a step-variable automatic transmission in which each of the gear positions is formed. In this example, the gear positions formed by the step-variable transmission portion 20 are referred to as AT gear positions. The AT input rotation speed Ni is an input rotation speed of the step-variable transmission portion 20, which is a rotation speed of the input rotating member of the step-variable transmission portion 20, has the same value as a rotation speed of the intermediate transmitting member 30, and has the same value as an MG2 rotation speed Nm, which is a rotation speed of the second rotating machine MG2. That is, the AT input rotation speed Ni can be represented by the MG2 rotation speed Nm. The output rotation speed No is a rotation speed of the output shaft 22, which is an output rotation speed of the step-variable transmission portion 20, and is also an output rotation speed of a composite transmission 40 that is a general transmission acquired by combining the continuously variable transmission portion 18 and the step-variable transmission portion 20. The composite transmission 40 is a transmission constituting a portion of a power transmission path between the engine 14 and the drive wheels 28.

Figures 2, 3:
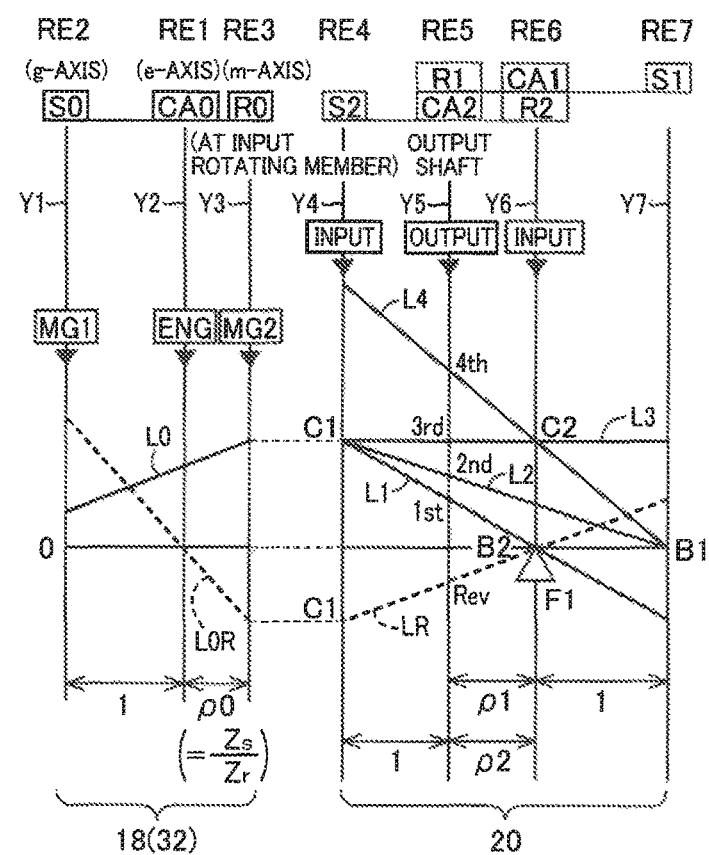
FIG. 2 is an operation chart for explaining a relationship between gear shift positions of a mechanical step-variable transmission portion illustrated in FIG. 1 and a combination of operations of engagement devices used therein.
FIG. 3 is a collinear chart representative of a relative relationship of rotation speeds of rotating elements in an electric continuously variable transmission portion and the mechanically step-variable transmission portion.

For example, as shown in an engagement operation table of FIG. 2, the step-variable transmission portion 20 has four forward AT gear positions from an AT first gear position ("1st" in FIG. 2) to an AT fourth gear position ("4th" in FIG. 2) formed as the AT gear positions. The AT first gear position has the largest speed change ratio γat, and the speed change ratio γat becomes smaller at the AT gear positions on the higher side. The engagement operation table of FIG. 2 summarizes the relationship between the AT gear positions and the operation states of the plurality of engagement devices. Therefore, the engagement operation table of FIG. 2 summarizes the relationship between the AT gear positions and predetermined engagement devices that are engagement devices engaged at the respective AT gear positions. In FIG. 2, a circle indicates engagement of a corresponding engagement device, a triangle indicates engagement when a corresponding AT gear position is achieved by engine braking or coast downshift, and a blank indicates release.

In the step-variable transmission portion 20, the electronic control device 90 described later switches the AT gear position formed in accordance with an accelerator operation of a driver, a vehicle speed V, etc., i.e., selectively forms each of a plurality of AT gear positions. For example, the step-variable transmission portion 20 performs a so-called clutch-to-clutch shift control in which a shift is performed by making a change of the engagement devices CB to be engaged, i.e., a shift is performed by switching engagement to release of certain engagement devices CB and switching release to engagement of another engagement devices CB. In this example, a downshift from the AT second gear position to the AT first gear position is represented as a 2→1 downshift, for example. The same applies to other upshifts and downshifts.

FIG. 3 is a collinear chart representative of a relative relationship of rotation speeds of the rotating elements in the continuously variable transmission portion 18 and the step-variable transmission portion 20. In FIG. 3, three vertical lines Y1, Y2, Y3 corresponding to the three rotating elements of the differential mechanism 32 constituting the continuously variable transmission portion 18 are a g-axis representative of the rotation speed of the sun gear S0 corresponding to a second rotating element RE2, an e-axis representative of the rotation speed of the carrier CA0 corresponding to a first rotating element RE1, and an m-axis representative of the rotation speed of the ring gear R0 corresponding to a third rotating element RE3 (i.e., the input rotation speed of the step-variable transmission portion 20) in order from the left side. Four vertical lines Y4, Y5, Y6, Y7 of the step-variable transmission portion 20 are axes respectively representative of the rotation speed of the sun gear S2 corresponding to a fourth rotating element RE4, the rotation speed of the ring gear R1 and the carrier CA2 coupled to each other corresponding to a fifth rotating element RE5 (i.e., the rotation speed of the output shaft 22), the rotation speed of the carrier CA1 and the ring gear R2 coupled to each other corresponding to a sixth rotating element RE6, and the rotation speed of sun gear S1 corresponding to a seventh rotating element RE7 in order from the left. Intervals between the vertical lines Y1, Y2, Y3 are determined in accordance with a gear ratio ρ0 of the differential mechanism 32. Intervals among the vertical lines Y4, Y5, Y6, Y7 are determined in accordance with gear ratios ρ1, ρ2 of the first and second planetary gear devices 36, 38. When the interval between the sun gear and the carrier is set to an interval corresponding to "1" in the relationship between the vertical axes of the collinear chart, an interval corresponding to a gear ratio ρ(=the number Zs of teeth of the sun gear/the number Zr of teeth of the ring gear) of the planetary gear device is set between the carrier and the ring gear.

As shown in the collinear chart of FIG. 3, in the differential mechanism 32 of the continuously variable transmission portion 18, the engine 14 (see "ENG" in FIG. 3) is coupled to the first rotating element RE1; the first rotating machine MG1 (see "MG1" in FIG. 3) is coupled to the second rotating element RE2; the second rotating machine MG2 (see "MG2" in FIG. 3) is coupled to the third rotating element RE3 rotating integrally with the intermediate transmitting member 30; and therefore, the rotation of the engine 14 is transmitted via the intermediate transmitting member 30 to the step-variable transmission portion 20. In the continuously variable transmission portion 18, the relationship between the rotation speed of the sun gear S0 and the rotation speed of the ring gear R0 is indicated by straight lines L0, L0R crossing the vertical line Y2.

In the step-variable transmission portion 20, the fourth rotating element RE4 is selectively coupled via the clutch C1 to the intermediate transmitting member 30; the fifth rotating element RE5 is coupled to the output shaft 22; the sixth rotating element RE6 is selectively coupled via the clutch C2 to the intermediate transmitting member 30 and selectively coupled via the brake B2 to the casing 16; and the seventh rotating element RE7 is selectively coupled via the brake B1 to the casing 16. In the step-variable transmission portion 20, the rotation speeds of the output shaft 22 at "1st", "2nd", "3rd", "4th", and "Rev" are indicated by respective straight lines L1, L2, L3, L4, LR crossing the vertical line Y5 in accordance with engagement/release control of the engagement devices CB.

The straight line L0 and the straight lines L1, L2, L3, L4 indicated by solid lines in FIG. 3 indicate the relative rotating speeds of the rotating elements during forward running in a hybrid running mode enabling a hybrid running in which at least the engine 14 is used as a power source for running. In this hybrid running mode, when a reaction torque, i.e., a negative torque from the first rotating machine MG1, is input to the sun gear S0 during positive rotation of the sun gear S0 while the engine torque Te is input to the carrier CA0 in the differential mechanism 32, an engine direct transmission torque $Td(=Te/(1+\rho 0)=-(1/\rho 0)\times Tg)$ appears in the ring gear R0 as a positive torque in positive rotation. A combined torque of the engine direct transmission torque Td and the MG2 torque Tm is transmitted as the drive torque of the vehicle 10 in the forward direction depending on a required drive force to the drive wheels 28 via the step-variable transmission portion 20 in which one of AT gear positions out of the AT first to AT fourth gear positions is formed. In this case, the first rotating machine MG1 functions as an electric generator generating a negative torque while positive rotation. A generated electric power Wg of the first rotating machine MG1 is stored in the battery 54 or consumed by the second rotating machine MG2. The second rotating machine MG2 outputs the MG2 torque Tm by using all or a portion of the generated electric power Wg or using an electric power from the battery 54 in addition to the generated electric power Wg.

Although a collinear chart in a motor running mode enabling a motor running is not shown in which the engine 14 is stopped and the second rotating machine MG2 is used as the power source for running, the rotation speed of the carrier CA0 is set to zero and the MG2 torque Tm is input to the ring gear R0 as a positive torque in positive rotation in the differential mechanism 32. In this case, the first rotating machine MG1 coupled to the sun gear S0 is brought into a no-load state and is idled in negative rotation. Therefore, in the motor running mode, the engine 14 is not driven so that the engine rotation speed Ne is made zero, and the MG2 torque Tm is transmitted as the drive torque of the vehicle 10 in the forward direction to the drive wheels 28 via the step-variable transmission portion 20 having any AT gear position formed out of the AT first to AT fourth gear positions. The MG2 torque Tm in this mode is the running torque in positive rotation.

The straight lines L0R and LR indicated by broken lines in FIG. 3 indicate the relative rotating speeds of the rotating elements in reverse running in the motor running mode. In the reverse running in this motor running mode, the MG2 torque Tm is input to the ring gear R0 as a negative torque while the second rotating machine MG2 rotates in negative rotation, and the MG2 torque Tm is transmitted as the drive torque to run the vehicle 10 in the reverse (backward) direction to the drive wheels 28 via the step-variable transmission portion 20 in which the AT first gear position is formed. The vehicle 10 can perform the reverse running when the electronic control device 90 described later causes the second rotating machine MG2 to output a reverse MG2 torque Tm while a forward lower-side AT gear position, for example, the AT first gear position, is formed. The reverse MG2 torque Tm has an opposite sign of positive/negative to a forward MG2 torque Tm which is output from the second rotating machine MG2 during forward running. In this case, the forward MG2 torque Tm is a running torque that is a positive torque in a positive rotation direction, and the reverse MG2 torque Tm is a running torque that is a negative torque in a negative rotation direction. In this way, the vehicle 10 performs the reverse running by inverting positiveness/negativeness of the MG2 torque Tm with the forward AT gear position. Using the forward AT gear position means using the same AT gear position as when the forward running is performed. Even in the hybrid running mode, the reverse running can be performed as in the motor running mode since the second rotating machine MG2 can rotate in the negative rotation direction as indicated by the straight line L0R.

In the power transmission device 12, the continuously variable transmission portion 18 is configured as an electric transmission mechanism including the differential mechanism 32 having the three rotating elements, which are the carrier CA0 as the first rotating element RE1 to which the engine 14 is coupled in a power transmittable manner, the sun gear S0 as the second rotating element RE2 to which the first rotating machine MG1 is coupled in a power transmittable manner, and the ring gear R0 as the third rotating element RE3 to which the intermediate transmitting member 30 is coupled in a power transmittable manner, such that the differential state of the differential mechanism 32 is controlled by controlling the operating state of the first rotating machine MG1. From another viewpoint, the third rotating element RE3 having the intermediate transmitting member 30 coupled thereto in a power transmittable manner is the third rotating element RE3 to which the second rotating machine MG2 is coupled in a power transmittable manner. Therefore, the power transmission device 12 has the continuously variable transmission portion 18 configured to have the differential mechanism 32 to which the engine 14 is coupled in a power transmittable manner and the first rotating machine MG1 coupled to the differential mechanism 32 in a power transmittable manner, such that the differential state of the differential mechanism 32 is controlled by controlling the operating state of the first rotating machine MG1. The continuously variable transmission portion 18 is operated as an electric continuously variable transmission to change a speed change ratio $\gamma 0(=Ne/Nm)$ that is a ratio of the engine rotation speed Ne having the same value as the rotation speed of the coupling shaft 34 serving as an input rotating member of the continuously variable transmission portion 18 to the MG2 rotation speed Nm that is the rotation speed of the intermediate transmitting member 30 serving as the output rotating member of the continuously variable transmission portion 18.

For example, in the hybrid running mode, when the rotation speed of the sun gear S0 is increased or decreased by controlling a rotation speed of the first rotating machine MG1 with respect to the rotation speed of the ring gear R0 restrained by the rotation of the drive wheels 28 since the AT gear position is formed in the step-variable transmission portion 20, the rotation speed of the carrier CA0, i.e., the engine rotation speed Ne, is increased or decreased. Therefore, in the hybrid running, the engine 14 can be operated at an efficient operating point. Thus, the composite transmission 40 is formed by the continuously variable transmission portion 18 and the step-variable transmission portion 20 arranged in series and serves as a continuously variable transmission as a whole.

Alternatively, the composite transmission 40 can serve as a step-variable transmission as a whole when the continuously variable transmission portion 18 performs shifting as in a step-variable transmission. In other words, in the composite transmission 40, the step-variable transmission portion 20 and the continuously variable transmission portion 18 can be controlled so as to selectively establish a plurality of gear positions different in a speed change ratio $\gamma t(=Ne/No)$ indicative of a value of a ratio of the engine rotation speed Ne to the output rotation speed No. In this example, the gear position established in the composite transmission 40 is referred to as a simulated gear position. The speed change ratio γt is a total speed change ratio formed by the continuously variable transmission portion 18 and the step-variable transmission portion 20 arranged in series and has a value obtained by multiplying the speed change ratio γ0 of the continuously variable transmission portion 18 by the speed change ratio γat of the step-variable transmission portion 20 (γt=γ0×γat).

For example, each of the simulated gear positions is established as a combination of one of the AT gear positions of the step-variable transmission portion 20 and at least one value of the speed change ratio γ0 of the continuously variable transmission portion 18. That is, at least one simulated gear position is formed with each AT gear position. For example, the simulated gear position is defined in advance such that simulated first to third gear positions are established for the AT first gear position, that simulated fourth to sixth gear positions are established for the AT second gear position, that simulated seventh to ninth gear positions are established for the AT third gear position, and that a simulated tenth gear position is established for the AT fourth gear position. In the composite transmission 40, the continuously variable transmission portion 18 is controlled to attain the engine rotation speed Ne at which a predetermined speed change ratio γt is achieved for the output rotation speed No, so that different simulated gear positions are established at one AT gear position. Additionally, in the composite transmission 40, the continuously variable transmission portion 18 is controlled in accordance with switching of the AT gear position so that the simulated gear position is switched.

Returning to FIG. 1, the vehicle 10 includes the electronic control device 90 as a controller including a control device of the vehicle 10 related to control of the engine 14, the continuously variable transmission portion 18, the step-variable transmission portion 20, etc. Therefore, FIG. 1 is a diagram showing an input/output system of the electronic control device 90 and is a functional block diagram for explaining a main portion of a control function of the electronic control device 90. The electronic control device 90 is configured to include a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. The electronic control device 90 may be configured separately for the engine control, the shift control, etc., as needed.

The electronic control device 90 is supplied with various signals etc. (e.g., the engine rotation speed Ne, the output rotation speed No corresponding to the vehicle speed V, an MG1 rotation speed Ng that is the rotation speed of the first rotating machine MG1, the MG2 rotation speed Nm that is the AT input rotation speed Ni, an accelerator opening degree θacc defined as a driver's accelerating operation amount representative of a magnitude of a driver's accelerating operation, a throttle valve opening degree θth that is an opening degree of an electronic throttle valve, a brake-on Bon that is a signal indicative of a state in which a brake pedal for actuating a wheel brake is operated by the driver, a brake operation amount Bra representative of a magnitude of a driver's break-pedal depressing operation corresponding to a depression force of the brake pedal, a steering angle θsw and a steering direction Dsw of a steering wheel included in the vehicle 10, a longitudinal acceleration Gx of the vehicle 10, a lateral acceleration Gy of the vehicle 10, a yaw rate Ryaw that is a rotation angular speed around the vertical axis of the vehicle 10, a battery temperature THbat, a battery charge/discharge current Ibat, and a battery voltage Vbat of the battery 54, a hydraulic oil temperature THoil that is a temperature of a hydraulic oil supplied to hydraulic actuators of the engagement devices CB, i.e., a hydraulic oil for operating the engagement devices CB, vehicle peripheral information Iard, a GPS signal (track signal) Sgps, a communication signal Scom, a navigation information Inavi, and an automatic driving selection signal Sauto representative of selection of automatic driving by the driver) based on detection values from various sensors etc. included in the vehicle 10 (e.g., an engine rotation speed sensor 60, an output rotation speed sensor 62, an MG1 rotation speed sensor 64, an MG2 rotation speed sensor 66, an accelerator opening degree sensor 68, a throttle valve opening degree sensor 70, a brake pedal sensor 71, a steering sensor 72, a G sensor 74, a yaw rate sensor 76, a battery sensor 78, an oil temperature sensor 79, a vehicle peripheral information sensor 80, a GPS antenna 81, an external network communication antenna 82, a navigation system 83, and an automatic driving selection switch 84).

The driver's accelerating operation amount representative of a magnitude of a driver's accelerating operation is, for example, an accelerator operation amount that is an operation amount of an accelerator operation member such as an accelerator pedal and is a driver's output request amount for the vehicle 10. The throttle valve opening degree θth etc. can be used as the driver's output request amount, in addition to the accelerator opening degree θacc.

The vehicle peripheral information sensor 80 includes at least one of a lidar device (Light Detection and Ranging, Laser Imaging Detection and Ranging), a radar device (Radio Detection and Ranging), and an onboard camera, for example, and directly acquires information on a road on which the vehicle 10 is running and information on an object present around the vehicle. The lidar device is, for example, a plurality of lidar devices respectively detecting objects ahead of, on the lateral sides of, and behind the vehicle 10 or one lidar device detecting objects all around the vehicle 10 and outputs object information on the detected objects as the vehicle peripheral information Iard. The radar device is, for example, a plurality of radar devices respectively detecting objects ahead of, in the vicinity ahead of, and in the vicinity behind the vehicle 10 and outputs object information on the detected objects as the vehicle peripheral information Iard. The object information from the lidar device or the radar device includes a distance and a direction of a detected object from the vehicle 10. The onboard camera is, for example, a monocular camera or a stereo camera disposed on the vehicle inner side of a windshield of the vehicle 10 for imaging the front of the vehicle 10 and outputs imaging information as the vehicle peripheral information Iard. The imaging information includes information of lanes of a running road, signs on the running road, and other vehicles, pedestrians, and obstacles on the running road, etc.

The GPS signal Sgps includes vehicle position information indicative of the position of the vehicle 10 on the earth's surface or a map based on signals transmitted by GPS (Global Positioning System) satellites.

The communication signal Scom includes, for example, road traffic information transmitted/received to/from a server or a center that is an external device such as a road traffic information communication system etc., and/or inter-vehicle communication information directly transmitted/received to/from other vehicles in the vicinity of the vehicle 10 without via the center. The road traffic information includes, for example, information of congestions, accidents, construction works, required travel times, and parking lots on roads. The inter-vehicle communication information includes, for example, vehicle information, running information, traffic environment information, etc. The vehicle information includes, for example, information indicative of a vehicle type of said other vehicle such as a passenger vehicle, a truck, and a two-wheel vehicle. The running information includes, for example, information of said other vehicle such as information indicative of the vehicle speed V, position information, brake-pedal operation information, turn-signal-lamp blinking information, and hazard-lamp blinking information. The traffic environment information includes, for example, information of congestions and constructions works of roads.

The navigation information Inavi includes, for example, road information stored in advance and road map information such as facility information. The road information includes information of road types such as urban roads, suburban roads, mountain roads, and automobile expressways, i.e., expressways, branching and merging of roads, road grades, and speed limits. The facility information includes information of types, locations, names, etc. of places such as a supermarket, a shop, a restaurant, a parking lot, a park, a place for repairing the vehicle 10, a home, and a service area on an expressway. The service area is a place having facilities for parking, eating, and refueling on an expressway, for example.

The electronic control device 90 outputs to the devices included in the vehicle 10 (e.g., the engine control device 50, the inverter 52, the hydraulic control circuit 56, the external network communication antenna 82, a wheel brake device 86, a steering device 88, and an information reporting device 89) various command signals (e.g., an engine control command signal Se for controlling the engine 14, a rotating machine control command signal Smg for controlling each of the first rotating machine MG1 and the second rotating machine MG2, an oil pressure control command signal Sat for controlling the operation state of the engagement devices CB, the communication signal Scom, a brake control command signal Sbra for controlling a braking torque from the wheel brake, a steering control command signal Sste for controlling steering of wheels (particularly, front wheels), and an information reporting control command signal Sinf for giving a warning or notification to the driver).

The wheel brake device 86 is a brake device applying a braking torque from the wheel brake to wheels. The wheel brake device 86 supplies a brake oil pressure to a wheel cylinder disposed on the wheel brake in accordance with a depressing operation of the brake pedal by a driver, for example. In the wheel brake device 86, during normal time, a master cylinder oil pressure generated from a brake master cylinder is directly supplied as the brake oil pressure to the wheel cylinder, where a magnitude of the master cylinder oil pressure corresponds to a depression force of the brake pedal. On the other hand, in the wheel brake device 86, for example, during ABS control, during vehicle speed control, or during automatic driving control, the brake oil pressure necessary for each of the controls is supplied to the wheel cylinder for generating the braking torque from the wheel brake. The wheels are the drive wheel 28 and driven wheels not shown.

The steering device 88 applies an assist torque to a steering system of the vehicle 10 in accordance with the vehicle speed V, the steering angle θsw, the steering direction Dsw, and the yaw rate Ryaw, for example. For example, during the automatic driving control, the steering device 88 applies a torque for controlling the steering of the front wheels to the steering system of the vehicle 10.

The information reporting device 89 is a device giving a warning or notification to the driver in the case of failure of some components involved in the running of the vehicle 10 or deterioration in the functions of the components, for example. The information reporting device 89 is, for example, a display device such as a monitor, a display, and an alarm lamp, and/or a sound output device such as a speaker and a buzzer. The display device is a device visually giving a warning or notification to the driver. The sound output device is a device aurally giving a warning or notification to the driver.

The electronic control device 90 calculates a state-of-charge value SOC [%] as an index indicative of a state of charge of the battery 54 based on the battery charge/discharge current Ibat and the battery voltage Vbat, for example. The electronic control device 90 calculates chargeable/dischargeable electric powers Win, Wout defining a usable range of a battery power Pbat that is the power in the battery 54 based on the battery temperature THbat and the state-of-charge value SOC of the battery 54, for example. The chargeable/dischargeable electric powers Win, Wout are the chargeable electric power Win that is an available electric power for input defining a limit of input electric power of the battery 54, and the dischargeable electric power Wout that is an available electric power for output defining a limit of output electric power of the battery 54. For example, the chargeable/dischargeable electric powers Win, Wout are made smaller as the battery temperature THbat decreases when the battery temperature THbat is in a low temperature range which is set lower than a normal usage range, and are made smaller as the battery temperature THbat increases when the battery temperature THbat is in a high temperature range which is set higher than the normal usage range. The chargeable electric power Win is made smaller as the state-of-charge value SOC increases when the state-of-charge value SOC is in a region where the state-of-charge value SOC is high. The dischargeable electric power Wout is made smaller as the state-of-charge SOC decreases when the state-of-charge value SOC is in a region where the state-of-charge value SOC is low.

To implement the various controls in the vehicle 10, the electronic control device 90 includes a driving control means, i.e., a driving control portion 91, an AT shift control means, i.e., an AT shift control portion 92, and a hybrid control means, i.e., a hybrid control portion 93.

The driving control portion 91 can selectively provide, as a driving control of the vehicle 10, a manual driving control for running based on a driving operation of the driver, and an automatic driving control for automatically setting a target running state based on at least one of the map information and the road information and automatically performing acceleration/deceleration and steering based on the target running state for running. The manual driving control is a driving control for running in accordance with a manual driving through a driver's driving operation. The manual driving is a driving method in which the normal running of the vehicle 10 is performed in accordance with a driver's driving operation such as an accelerator operation, a brake operation, and a steering operation. The automatic driving control is a driving control for running in accordance with an automatic driving. The automatic driving is a driving method in which the running of the vehicle 10 is performed by automatically performing acceleration/deceleration, braking, steering etc. under the control of the electronic control device 90 based on the signals and the information from the various sensors regardless of the driver's driving operation (intention).

The driving control portion 91 provides the manual driving control if the automatic driving is not selected by the automatic driving selection switch 84. The driving control portion 91 provides the manual driving control by outputting commands for respectively controlling the step-variable transmission portion 20, the engine 14, and the rotating machines MG1, MG2 to the AT shift control portion 92 and the hybrid control portion 93.

The driving control portion 91 provides the automatic driving control if the automatic driving selection switch 84 is operated by the driver and the automatic driving is selected. Specifically, the driving control portion 91 automatically sets the target running state based on various settings including a destination, a fuel consumption priority degree, a set vehicle speed, etc. input by the driver; the vehicle position information based on the GPS signal Sgps; the map information including a road condition such as a curve, a grade, an altitude, a legal speed, etc., infrastructure information, a target route and a target course, weather, etc. based on the navigation information Inavi and/or the communication signal Scom; and road information including lanes of the running road, signs on the running road, pedestrians on the running road, etc. based on the vehicle peripheral information Iard. The driving control portion 91 sets a target vehicle speed as the target running state based on a target inter-vehicle distance to a preceding vehicle and an actual inter-vehicle distance to the preceding vehicle in consideration of a safety margin. For the target running state, for example, a target drive force or a target acceleration/deceleration may be set. The driving control portion 91 provides the automatic driving control by automatically performing acceleration/deceleration, braking, and steering based on the set target running state. The acceleration/deceleration is acceleration of the vehicle 10 and deceleration of the vehicle 10, and the deceleration may include braking. The driving control portion 91 calculates an F/F drive force according to a feedforward control based on, for example, the target vehicle speed defined as the target running state, and an F/B drive force according to a feedback control based on a vehicle speed difference between the target vehicle speed and the actual vehicle speed V. Subsequently, the driving control portion 91 calculates a required drive force or a required braking force of the power transmission device 12 based on a total drive force of the F/F drive force and the F/B drive force and a running resistance. The running resistance may be, for example, a value set in advance by the driver for the vehicle 10, a value based on map information acquired through communication with the outside of the vehicle 10 and/or vehicle specifications, or an estimated value calculated based on a grade of a road, an actual drive amount, an actual longitudinal acceleration Gx, etc. during running. The driving control portion 91 outputs the commands to the AT shift control portion 92 and the hybrid control portion 93 for respectively controlling the step-variable transmission portion 20, the engine 14, and the rotating machines MG1, MG2 so as to obtain a required drive force or the required braking force. The driving control portion 91 calculates the required braking force obtained from the wheel brake within an available range and outputs the brake control command signal Sbra to the wheel brake device 86 for controlling the braking torque so as to obtain the required braking force. As a result, the step-variable transmission portion 20, the engine 14, and the rotating machines MG1, MG2 are controlled to obtain a desired drive torque or braking torque. The braking torque in this case is an engine braking torque from the engine 14 or a regenerative braking torque from the second rotating machine MG2. Alternatively, the wheel brake device 86 is controlled to obtain a desired braking torque from a foot brake. Additionally, the driving control portion 91 outputs to the steering device 88 the steering control command signal Sste for controlling the steering of the front wheels based on the set target running state.

The control by the AT shift control portion 92 and the hybrid control portion 93 in the manual driving control according to normal running will hereinafter specifically be described by.

Figure 4:
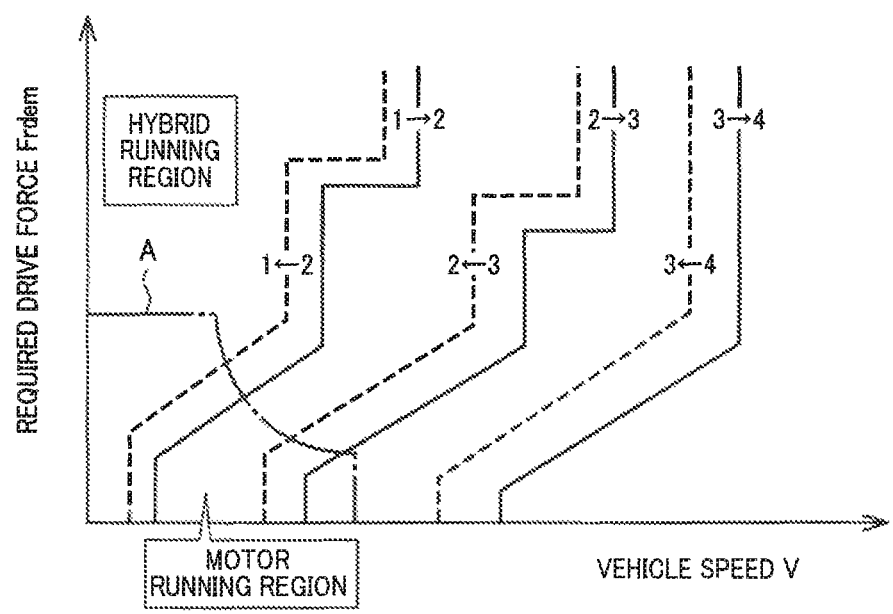
FIG. 4 is a diagram showing an example of a shift map used for shift control of the step-variable transmission portion and a power source switching map used for switching control between hybrid running and motor running, also showing a relationship of the maps.

The AT shift control portion 92 determines a shift of the step-variable transmission portion 20 by using, for example, an AT gear position shift map as shown in FIG. 4, which is a relationship obtained empirically or through design and stored in advance, i.e., a predefined relationship, and provides the shift control of the step-variable transmission portion 20 as needed. In the shift control of the step-variable transmission portion 20, the AT shift control portion 92 outputs to the hydraulic control circuit 56 the oil pressure control command signal Sat for switching the engagement/release state of the engagement devices CB by the solenoid valves SL1 to SL4 so as to automatically switch the AT gear position of the step-variable transmission portion 20. The AT gear position shift map is a predetermined relationship having shift lines for determining the shift of the step-variable transmission portion 20 on two-dimensional coordinates using the vehicle speed V and a required drive force Frdem as variables, for example. In this case, the output rotation speed No etc. may be used instead of the vehicle speed V, or a required drive torque Trdem, the accelerator opening degree θacc, the throttle valve opening degree θth, etc. may be used instead of the required drive force Frdem. The shift lines in the AT gear position shift map include upshift lines for determining an upshift as indicated by solid lines and downshift lines for determining a downshift as indicated by broken lines.

The hybrid control portion 93 has a function of an engine control means, i.e., an engine control portion, controlling the operation of the engine 14, and a function of a rotating machine control means, i.e., a rotating machine control portion, controlling the operations of the first rotating machine MG1 and the second rotating machine MG2 via the inverter 52, and provides a hybrid drive control etc. using the engine 14, the first rotating machine MG1, and the second rotating machine MG2 through these control functions. The hybrid control portion 93 calculates the required drive force Frdem [N] at the drive wheels 28 in terms of a drive request amount by applying the accelerator opening degree θacc and the vehicle speed V to, for example, a drive request amount map that is a predefined relationship. The required drive torque Trdem [Nm] at the drive wheels 28, a required drive power Prdem [W] at the drive wheels 28, a required AT output torque at the output shaft 22, etc. can be used as the drive request amount, instead of the required drive force Frdem. In the automatic driving control, a required drive force for implementing the automatic driving control is calculated. The hybrid control portion 93 outputs the engine control command signal Se that is a command signal for controlling the engine 14 and the rotating machine control command signal Smg that is a command signal for controlling the first rotating machine MG1 and the second rotating machine MG2 so as to achieve the required drive power Prdem in consideration of the chargeable/dischargeable electric power Win, Wout, etc. of the battery 54. The engine control command signal Se is, for example, a command value of an engine power Pe that is the power of the engine 14 outputting the engine torque Te at the current engine rotation speed Ne. The rotating machine control command signal Smg is, for example, a command value of the generated electric power Wg of the first rotating machine MG1 outputting the MG1 torque Tg as the reaction torque of the engine torque Te at the MG1 rotation speed Ng which is the MG1 rotation speed Ng at the time of command signal Smg output, and is a command value of a consumed electric power Wm of the second rotating machine MG2 outputting the MG2 torque Tm at the MG2 rotation speed Nm which is the MG2 rotation speed Nm at the time of command signal Smg output.

For example, if the composite transmission 40 is operated as a continuously variable transmission as a whole by operating the continuously variable transmission portion 18 as a continuously variable transmission, the hybrid control portion 93 controls the engine 14 and controls the generated electric power Wg of the first rotating machine MG1 so as to attain the engine rotation speed Ne and the engine torque Te at which the engine power Pe achieving the required drive power Prdem is acquired in consideration of an engine optimum fuel consumption point etc., and thereby provides a continuously variable shift control of the continuously variable transmission portion 18 to change the speed change ratio γ0 of the continuously variable transmission portion 18. As a result of this control, the speed change ratio γt of the composite transmission 40 is controlled while the composite transmission 40 is operated as a continuously variable transmission.

For example, when the composite transmission 40 is operated as a step-variable transmission as a whole by controlling the continuously variable transmission portion 18 to perform as in a step-variable transmission, the hybrid control portion 93 uses a predetermined relationship, for example, a simulated gear position shift map, to determine the shift of the composite transmission 40 and provides the shift control of the continuously variable transmission portion 18 so as to selectively establish the plurality of simulated gear positions in coordination with the shift control of the AT gear position of the step-variable transmission portion 20 by the AT shift control portion 92. The plurality of simulated gear positions can be established by controlling the engine rotation speed Ne by the first rotating machine MG1 in accordance with the vehicle speed V so as to maintain the respective speed change ratios γt. The speed change ratio γt of each of the simulated gear positions may not necessarily be a constant value over the entire region of the vehicle speed V and may be changed in a predetermined region or may be limited by an upper limit, a lower limit, etc. of the rotation speed of the portions. As described above, the hybrid control portion 93 can provide the shift control in which the engine rotation speed Ne is changed as in a step-variable shift. A simulated step-variable shift control of causing the composite transmission 40 to perform a shift as in a step-variable transmission as a whole may be provided only in priority to the continuously variable shift control of operating the composite transmission 40 as a continuously variable transmission as a whole in the case that, for example, the driver selects a running mode placing emphasis on running performance such as a sports running mode etc. or the required drive torque Trdem is relatively large; however, the simulated step-variable shift control may basically be provided except when a predetermined restriction is placed on provision.

The hybrid control portion 93 selectively establishes the motor running mode or the hybrid running mode as a running mode depending on a running state. For example, the hybrid control portion 93 establishes the motor running mode when the required drive power Prdem is in a motor running region smaller than a predefined threshold value, and establishes the hybrid running mode when the required drive power Prdem is in a hybrid running region equal to or greater than the predefined threshold value. A dashed-dotted line A of FIG. 4 is a boundary line for switching the power source for running of the vehicle 10 between only the second rotating machine MG2 and at least the engine 14. That is, the dashed-dotted line A of FIG. 4 is a boundary line between the hybrid running region and the motor running region for switching between the hybrid running and the motor running. A predefined relationship having the boundary line as indicated by the dashed-dotted line A of FIG. 4 is an example of a power source switching map defined by two-dimensional coordinates of the vehicle speed V and the required drive force Frdem. This power source switching map is predefined together with the AT gear position shift map indicated by the solid lines and the broken lines also in FIG. 4, for example.

Even when the required drive power Prdem is in the motor running region, the hybrid control portion 93 establishes the hybrid running mode if the state-of-charge value SOC of the battery 54 is less than a predefined engine start threshold value. The motor running mode is a running state in which the second rotating machine MG2 generates a drive torque for running while the engine 14 is stopped. The hybrid running mode is a running state in which the engine 14 is operated for running. The engine start threshold value is a predefined threshold value for determining that the state-of-charge value SOC reaches a level at which the engine 14 must forcibly be started for charging the battery 54.

When the running performance of the vehicle 10 is limited as compared to original performance due to failure of some components related to the running of the vehicle 10 or deterioration in function of the components, the driving control portion 91 establishes a fail-safe mode that is a control mode for a state in which the running performance is limited. Specifically, at the time of a failure or a deterioration in function of a component related to the control of the engine 14, in which the engine 14 is unable to output the engine power Pe or the maximum value of the engine power Pe is lowered, the driving control portion 91 establishes a fail-safe mode in which the motor running using the second rotating machine MG2 is performed or mainly performed for running. At the time of a failure or a deterioration in function of a component related to the control of the second rotating machine MG2, in which the second rotating machine MG2 is unable to output output power or the maximum value of the output power of the second rotating machine MG2 is lowered, the driving control portion 91 establishes a fail-safe mode in which the engine 14 is used or mainly used for running in the hybrid running. At the time of a failure or a deterioration in function of a component related to the control of the hydraulic control circuit 56, the driving control portion 91 establishes a fail-safe mode in which the shift control is provided within a range of the AT gear positions currently formable in the step-variable transmission portion 20.

It is conceivable that when the vehicle 10 is in a state in which the running performance of the vehicle 10 is limited, evacuation running is performed to a place as safe as possible. On the other hand, it is conceivable that travelable road and distance for the vehicle 10 may be different according to how the running performance of the vehicle 10 is differently limited. Therefore, it is desirable to perform the evacuation running to a place as safe as possible in accordance with a kind of the fail-safe mode.

To implement a control function of performing the evacuation running to a place as safe as possible in accordance with the fail-safe mode, the electronic control device 90 further includes a state determining means, i.e., a state determining portion 94, a drive torque calculating means, i.e., a drive torque calculating portion 96, a remaining running distance calculating means, i.e., a remaining running distance calculating portion 97, and a destination setting means, i.e., a destination setting portion 98.

The state determining portion 94 determines whether a state of the vehicle 10 is a state in which the running performance of vehicle 10 is limited. For example, the state determining portion 94 determines based on whether any fail-safe mode is established by the driving control portion 91 whether the state of the vehicle 10 is a state in which the running performance of the vehicle 10 is limited.

The state determining portion 94 determines whether the automatic driving is in progress with the automatic driving control provided by the driving control portion 91, when it is determined that the fail-safe mode is established.

Figure 5:
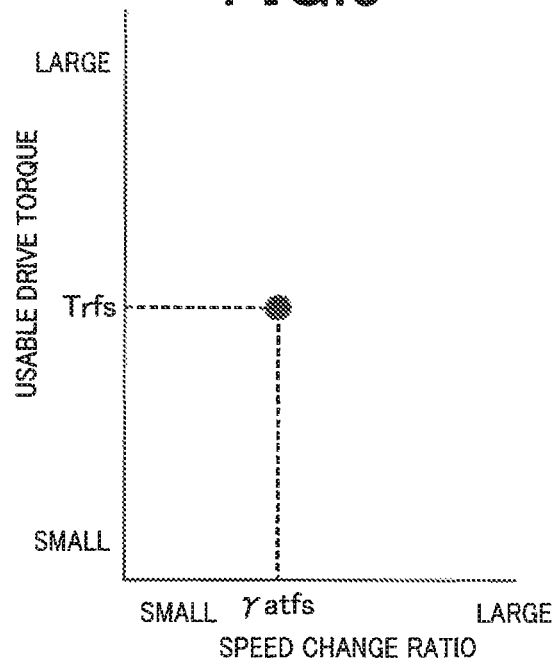
FIG. 5 is a diagram showing an example of calculation of a usable drive torque.

The drive torque calculating portion 96 calculates a usable drive torque Trfs as a drive torque Tr that can be output in the vehicle 10, i.e., the drive torque Tr usable even in the fail-safe mode, based on the state of the vehicle 10, i.e., based on the state in which the running performance of the vehicle 10 is limited, when the state determining portion 94 determines that any fail-safe mode is established. Specifically, the drive torque calculating portion 96 calculates a usable engine torque Tefs that is the engine torque Te usable in an established fail-safe mode and a usable MG2 torque Tmfs that is the MG2 torque Tm usable in the fail-safe mode. The drive torque calculating portion 96 calculates a usable engine direct transmission torque Tdfs(=Tefs/(1+ρ0)) that is the engine direct transmission torque Td of the usable engine torque Tefs. The drive torque calculating portion 96 calculates the usable drive torque Trfs(=(Tdfs+Tmfs)×γatfs× i) based on the usable engine direct transmission torque Tdfs and the usable MG2 torque Tmfs (see FIG. 5). It is noted that "γtfs" is the speed change ratio γat at the lowermost-side AT gear position among the AT gear positions of the step-variable transmission portion 20 usable in the fail-safe mode, and "i" is a speed reduction ratio of the differential gear device 24 etc.

Figure 6:
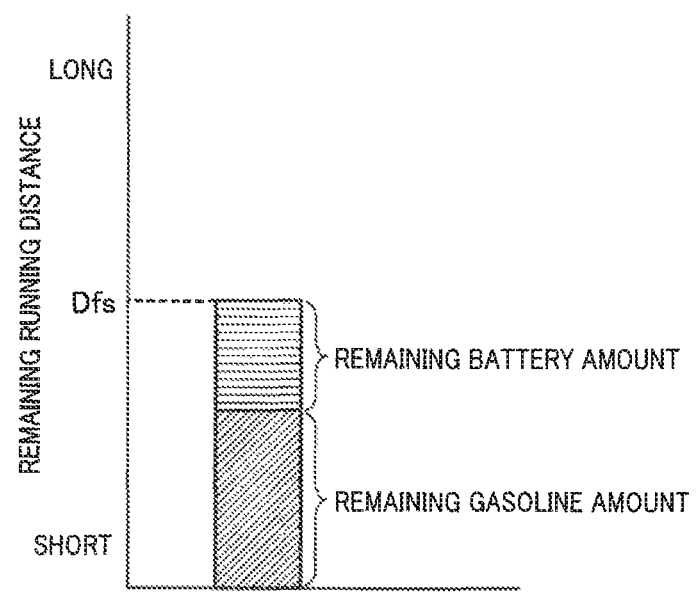
FIG. 6 is a diagram showing an example of calculation of a remaining travelable distance.

If the state determining portion 94 determines that any of the fail-safe mode is established, the remaining running distance calculating portion 97 calculates a remaining travelable distance Dfs that is a remaining distance for which the vehicle 10 can run, based on the state of the vehicle 10, i.e., based on the state in which the running performance of the vehicle 10 is limited. Specifically, the remaining running distance calculating portion 97 calculates the remaining travelable distance Dfs based on the state of the engine 14 and the second rotating machine MG2 usable at the time of establishment of the fail-safe mode and the energy stored in the vehicle 10. The energy stored in the vehicle 10 is, for example, a remaining amount Fuel [L] of gasoline and the state-of-charge value SOC of the battery 54. In this example, the remaining amount Fuel of gasoline may be referred to as a remaining gasoline amount Fuel, and the state-of-charge value SOC of the battery 54 may be referred to as a remaining battery amount SOC. The remaining running distance calculating portion 97 calculates a remaining travelable distance Dfsemg with the engine 14 based on the remaining gasoline amount Fuel and an average fuel consumption [km/L] stored in the vehicle 10 when the engine 14 can be used in an established fail-safe mode. The remaining running distance calculating portion 97 calculates a remaining travelable distance Dfsmg2 according to the second rotating machine MG2 based on the remaining battery amount SOC and an average electric power consumption (mileage per unit electric energy) [km/SOC] stored in the vehicle 10 when the second rotating machine MG2 can be used in an established fail-safe mode. For example, the remaining running distance calculating portion 97 defines a total value of the remaining travelable distance Dfsemg according to the engine 14 and the remaining travelable distance Dfsmg2 according to the second rotating machine MG2 as the remaining travelable distance Dfs (see FIG. 6) when the engine 14 and the second rotating machine MG2 can be used in an established fail-safe mode.

The destination setting portion 98 sets a destination of running of the vehicle 10 based on the usable drive torque Trfs calculated by the drive torque calculating portion 96 and the remaining travelable distance Dfs calculated by the remaining running distance calculating portion 97, when the state determining portion 94 determines that any fail-safe mode is established. The destination of running of the vehicle 10 is a destination when the evacuation running is performed through the automatic driving in an established fail-safe mode. In this example, the destination at the time of the evacuation running is referred to as an emergency destination.

Figure 7:
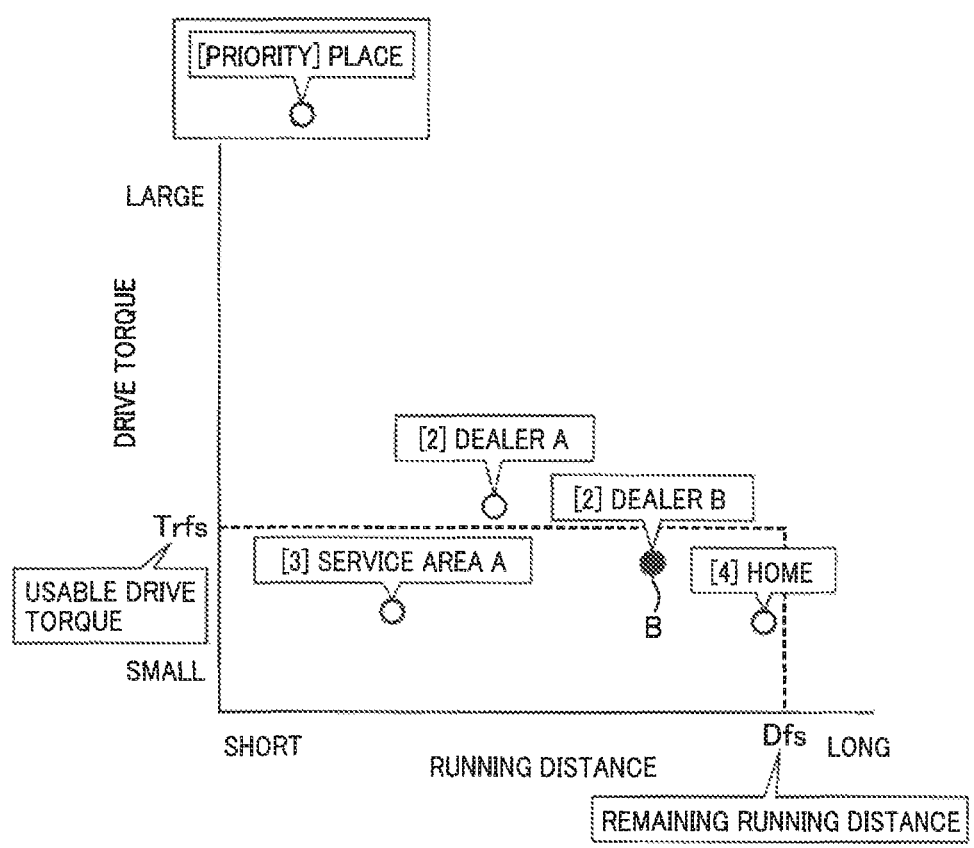
FIG. 7 is a diagram showing an example of setting of candidates of an emergency destination and setting of the emergency destination.

Specifically, for example, candidates for the emergency destination are determined in advance from the facility information including in the navigation information Inavi. The candidates for the emergency destination are, for example, a dealer or a repair shop that is a place for repairing the vehicle 10, a service area on an expressway, the driver's home or a parking lot of the vehicle 10 around the home, a public parking lot, etc. The destination setting portion 98 prioritizes the candidates for the emergency destination. For example, the destination setting portion 98 gives higher priority to the dealer, the service area, the home, etc. in this order. For example, the destination setting portion 98 puts a plurality of dealers in order of higher priority as a number of visits increases or a distance from the position of the vehicle 10 decreases, when a plurality of dealers exists. For each of the candidates for the emergency destination, the destination setting portion 98 calculates a maximum drive torque required for a running route to the emergency destination candidate and a running distance from the position of the vehicle 10 to the candidate for the emergency destination. For example, the maximum drive torque required for the running route is made larger when a grade of an uphill road in the running route is larger. The destination setting portion 98 sets the candidate for the emergency destination with the highest priority as the emergency destination out of the candidates for the emergency destination having the maximum drive torque required for the running route within the usable drive torque Trfs and the running distance to the candidate for the emergency destination within the remaining travelable distance Dfs. When the candidates for the emergency destination are shown in FIG. 7, for example, a dealer B indicated by a black circle B is set as the emergency destination. As described above, the destination setting portion 98 preferentially sets a place having high priority as the emergency destination out of the predefined prioritized places. Additionally, the destination setting portion 98 considers a predefined place for repairing the vehicle 10 as the place having the highest priority when setting the emergency destination.

During running on a general road i.e. non-expressway road, it is preferable that the candidate set as the emergency destination is other than a service area of an expressway or a candidate for the emergency destination causing the vehicle to pass through an expressway. During running on a general road, if a service area of an expressway or a candidate for the emergency destination causing the vehicle to pass through an expressway has the highest priority out of the candidates for the emergency destination within the usable drive torque Trfs and within the remaining travelable distance Dfs, the destination setting portion 98 sets as the emergency destination a candidate for the emergency destination having a highest priority out of the candidates for the emergency destination excluding the service areas of expressways and the candidates for the emergency destination causing the vehicle to pass through an expressway. In some cases, a lowest speed limit may be set on an expressway. In the fail-safe mode, the vehicle speed V achievable by the vehicle 10 may be limited, and therefore, during running on an expressway, the emergency destination is preferably set such that the vehicle 10 runs on the general road as much as possible. Even on a general road, when the vehicle is running on a mountain road, the emergency destination is preferably set such that the vehicle 10 runs on an urban road etc. on which a limitation on the drive torque Tr is hardly placed. As described above, the destination setting portion 98 sets the emergency destination based on the type of the road on which the vehicle 10 is currently running. Additionally, the destination setting portion 98 sets the emergency destination such that the vehicle 10 runs on a road other than an expressway in priority to the expressway on a route to the emergency destination.

If the state determining portion 94 determines that any fail-safe mode is established, the driving control portion 91 provides the automatic driving control based on the emergency destination set by the destination setting portion 98.

Specifically, the driving control portion 91 changes the current destination in the automatic driving to the emergency destination set by the destination setting portion 98, when the state determining portion 94 determines that any fail-safe mode is established and it is determined that the automatic driving is being performed. On the other hand, when the state determining portion 94 determines that any fail-safe mode is established and it is determined that the automatic driving is not being performed, the driving control portion 91 sets the emergency destination set by the destination setting portion 98. The driving control portion 91 then performs emergency automatic driving that is automatic driving control of performing the automatic driving toward the emergency destination. The driving control portion 91 outputs to the information reporting device 89 the information reporting control command signal Sinf for informing the driver that the emergency automatic driving is in progress.

The driving control portion 91 provides the automatic driving control using at least one power source of the engine 14 and the second rotating machine MG2 based on the state of the vehicle 10, i.e., based on the state in which the running performance of the vehicle 10 is limited. Therefore, the driving control portion 91 performs the emergency automatic driving based on the state of the engine 14 and the second rotating machine MG2 usable in the established fail-safe mode when any fail-safe mode is established.

In the fail-safe mode, the range of the AT gear position achievable in the step-variable transmission portion 20 may be limited only to, for example, a low gear side range or a high gear side range. When the vehicle 10 is running on an expressway, or when the vehicle 10 is to run on an expressway on a route to the emergency destination, or when the vehicle 10 needs to use an expressway to quickly arrive at the emergency destination, the emergency automatic driving is preferably performed in a fail-safe mode in which the range of the AT gear position achievable in the step-variable transmission portion 20 is limited only to the high gear side range. When the vehicle 10 is running on a general road, or when running on an expressway is shortly to be changed to running on a general road on the route to the emergency destination, or when the relatively large drive torque Tr is required for running the vehicle 10 along the route to the emergency destination, the emergency automatic driving is preferably performed in the fail-safe mode in which the range of the AT gear position achievable by the step-variable transmission portion 20 is limited only to the low gear side range. When the fail-safe modes can be switched therebetween, the fail-safe mode is preferably selected that is suitable the road on which the vehicle 10 is running or the road on the route to the emergency destination. The driving control portion 91 controls the power transmission device 12, for example, the step-variable transmission portion 20, based on the type of the road on which the vehicle 10 is currently running to provide the automatic driving control, i.e., to perform the emergency automatic driving. Alternatively, the driving control portion 91 controls the power transmission device 12, for example, the step-variable transmission portion 20, based on the type of the road in the route to the emergency destination to provide the automatic driving control, i.e., to perform the emergency automatic driving.

Figure 8:
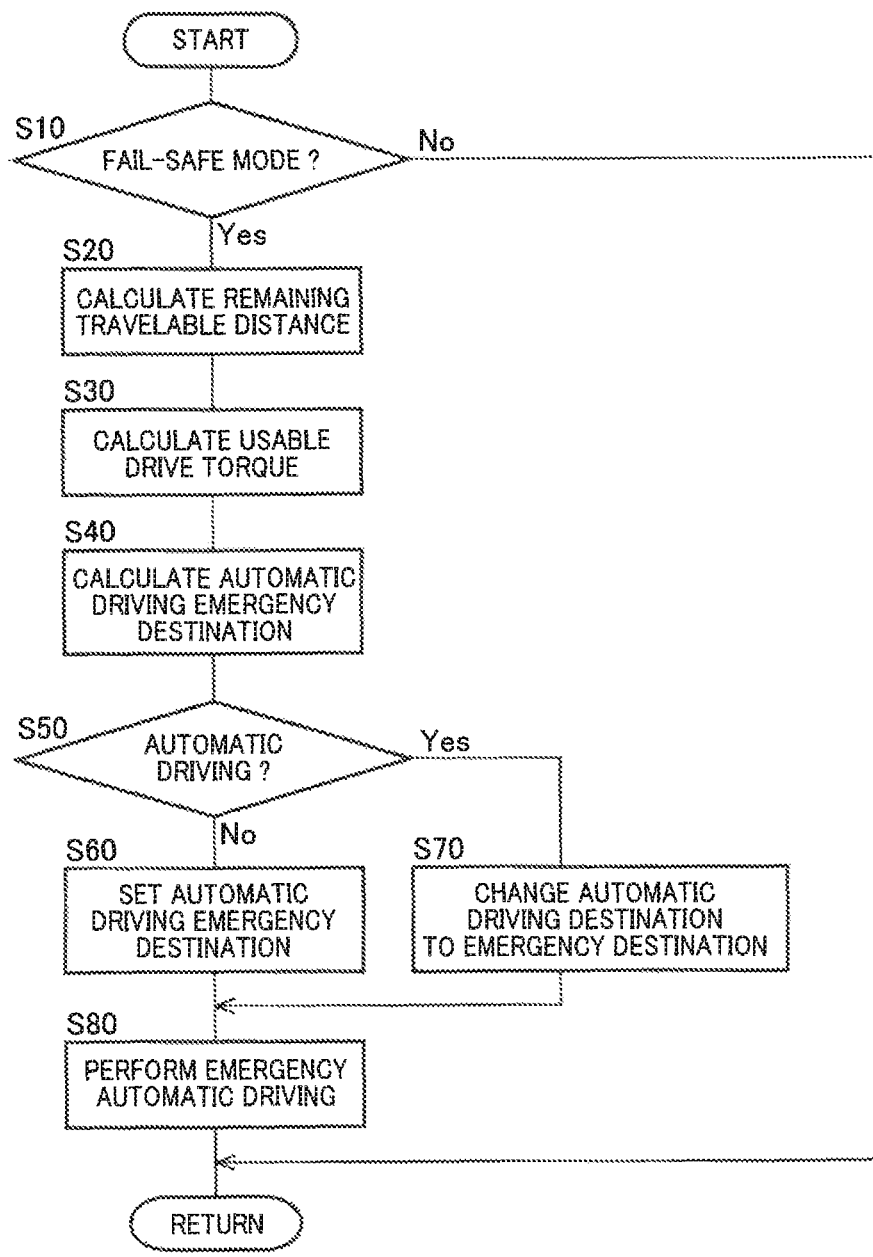
FIG. 8 is a flowchart for explaining a main portion of a control operation of an electronic control device, i.e., the control operation for appropriately performing evacuation running when a running performance of the vehicle is limited.

FIG. 8 is a flowchart for explaining a main portion of a control operation of the electronic control device 90, i.e., the control operation for appropriately performing the evacuation running when the running performance of the vehicle 10 is limited, and is executed repeatedly, for example.

In FIG. 8, first, at step (hereinafter, step is omitted) S10 corresponding to the function of the state determining portion 94, it is determined whether any fail-safe mode is established. If the determining of S10 is negative, this routine is terminated. If the determining of S10 is affirmative, at S20 corresponding to the function of the remaining running distance calculating portion 97, the remaining travelable distance Dfs is calculated based on the state of the engine 14 and the second rotating machine MG2 usable in the established fail-safe mode and the energy stored in the vehicle 10. Subsequently, at S30 corresponding to the function of the drive torque calculating portion 96, the usable drive torque Trfs is calculated based on the usable engine torque Tefs and the usable MG2 torque Tmfs. Subsequently, at S40 corresponding to the function of the destination setting portion 98, the emergency destination through automatic driving is set based on the remaining travelable distance Dfs calculated at S20 and the usable drive torque Trfs calculated at S30. At this step, considerations are given to the priorities of the candidates for the emergency destination, the type of the road on which the vehicle 10 is currently running, etc. Subsequently, at S50 corresponding to the function of the state determining portion 94, it is determined whether the automatic driving is in progress. If the determining of S50 is negative, at S60 corresponding to the function of the driving control portion 91, the emergency destination set at S40 is set to be the destination through the automatic driving control. If the determining of S50 is affirmative, at S70 corresponding to the function of the driving control portion 91, the current destination during the automatic driving is canceled, and the emergency destination set at S40 is set as the destination through the automatic driving control. Subsequent to S60 or S70, at S80 corresponding to the function of the driving control portion 91, the emergency automatic driving to the emergency destination is performed. At this step, the emergency automatic driving is performed based on the state of the engine 14 and the second rotating machine MG2 usable in the established fail-safe mode. Additionally, the fail-safe modes are switched therebetween based on the type of the road on which the vehicle 10 is currently running or the type of the road in the route to the emergency destination. The driver may be informed that the emergency automatic driving is in progress.

As described above, according to this example, when it is determined that the vehicle 10 is in the state in which the running performance thereof is limited, the emergency destination through the automatic driving is set on the basis of the usable drive torque Trfs and the remaining travelable distance Dfs based on the state of the vehicle 10, and the automatic driving control is provided based on the emergency destination, so that the evacuation running can be performed through the automatic driving to the emergency destination at which the vehicle 10 can arrive in the state in which the running performance thereof is limited. Therefore, when the running performance of the vehicle 10 is limited, the evacuation running can appropriately be performed.

According to this example, since the automatic driving control is provided by using at least one of the engine 14 and the second rotating machine MG2 based on the state of the vehicle 10, the evacuation running can be performed through the automatic driving to the emergency destination at which the vehicle 10 can arrive in the state in which the running performance thereof is limited.

According to this example, since the emergency destination is set based on the type of the road on which the vehicle 10 is currently running, the evacuation running can be performed in consideration of running limitations on the vehicle speed V etc. due to a difference in type of roads.

According to this example, since the emergency destination is set such that the vehicle 10 runs to the emergency destination on a road other than an expressway rather than on the expressway, the evacuation running can be performed on a road where running limitations on the vehicle speed V etc. are hardly placed.

According to this example, since the place having high priority is set as the emergency destination among predefined prioritized places, the evacuation running can be performed toward a place having a priority set as high as possible.

According to this example, since the predefined place for repairing the vehicle 10 is considered as the place having the highest priority when the emergency destination is set, the evacuation running can be performed in consideration of repair of the vehicle 10 after arriving at the emergency destination.

According to this example, the step-variable transmission portion 20 is controlled based on the type of the road on which the vehicle 10 is currently running or the type of the road on the route to the emergency destination to provide the automatic driving control, the running performance can more easily be ensured in consideration of a difference in type of the road on which the vehicle 10 runs under the situation where the running performance of the vehicle 10 is limited.

Another example of the present invention will be described in detail with reference to the drawings. In the following description, the portions common to the examples are denoted by the same reference numerals and will not be described.

SECOND EXAMPLE

Figure 9:
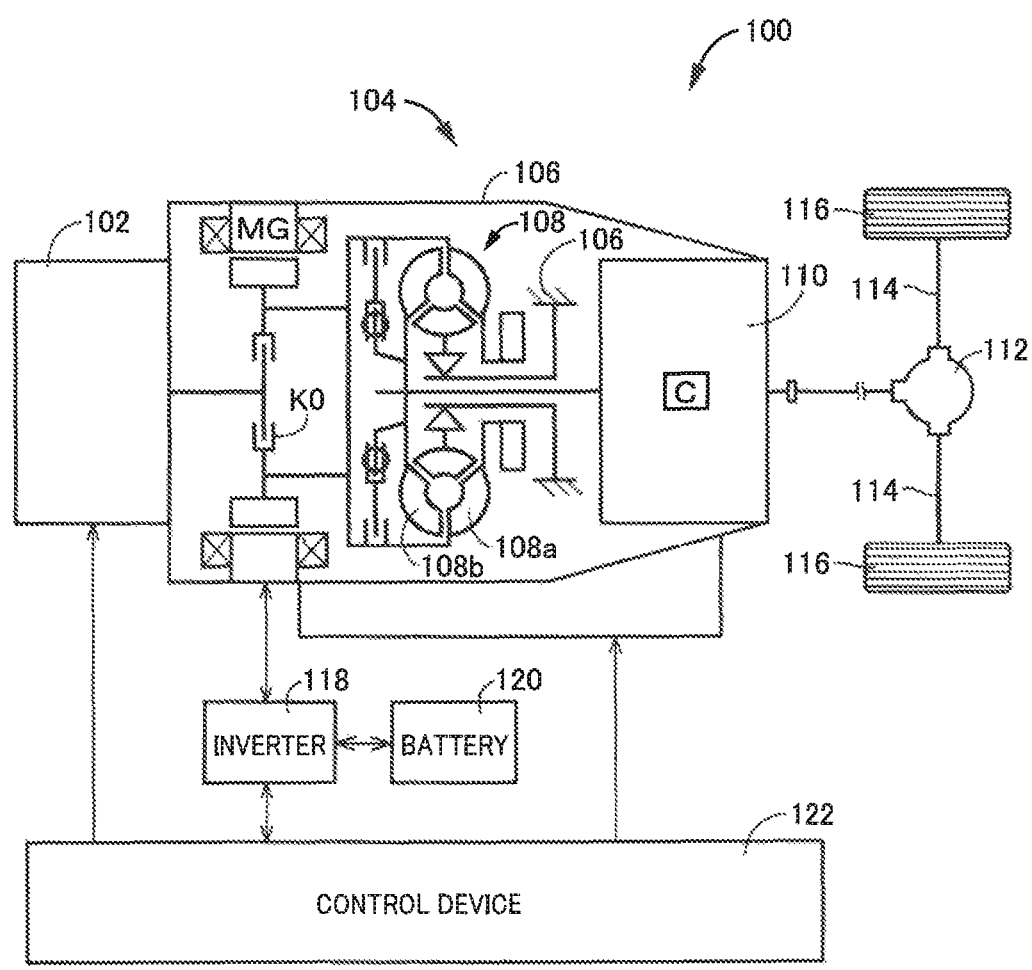
FIG. 9 is a diagram for explaining a schematic configuration of a vehicle to which the present invention is applied and is a diagram for explaining a vehicle different from FIG. 1.

As shown in FIG. 9, a vehicle 100 illustrated in this example is different from the vehicle 10 including the continuously variable transmission portion 18 and the step-variable transmission portion 20 in series shown in the first example described above.

In FIG. 9, the vehicle 100 is a hybrid vehicle including an engine 102 functioning as a power source, a rotating machine MG functioning as a power source, and a power transmission device 104. The power transmission device 104 includes a clutch K0, a torque converter 108, an automatic transmission 110, etc. in order from the engine 102 side in a casing 106 serving as a non-rotating member attached to a vehicle body. The power transmission device 104 further includes a differential gear device 112, axles 114, etc. A pump impeller 108a of the torque converter 108 is coupled via the clutch K0 to the engine 102 and directly coupled to the rotating machine MG A turbine impeller 108b of the torque converter 108 is directly coupled to the automatic transmission 110. In the power transmission device 104, power of the engine 102 and/or power of the rotating machine MG is transmitted sequentially via the clutch K0, the torque converter 108, the automatic transmission 110, the differential gear device 112, the axles 114, etc. to drive wheels 116 disposed on the vehicle 100. The power is transmitted via the clutch K0 when the power of the engine 102 is transmitted. The automatic transmission 110 is a transmission constituting a portion of a power transmission path between the power source (the engine 102, the rotating machine MG) and the drive wheels 116, is a mechanical transmission mechanism as with the step-variable transmission portion 20 described in the first example, and is a known planetary gear type automatic transmission in which each gear position out of a plurality of gear positions is formed by engaging predetermined engagement device(s) included in a plurality of engagement devices C. The vehicle 100 also includes an inverter 118, a battery 120 serving as an electric storage device giving and receiving an electric power to and from the rotating machine MG via the inverter 118, and a control device 122.

The control device 122 releases the clutch K0 to enable motor running using only the rotating machine MG as the drive power source for running using the electric power from the battery 120 with the operation of the engine 102 stopped. The control device 122 operates the engine 102 with the clutch K0 engaged to enable hybrid running using the engine 102 as the power source for running. In a hybrid running mode enabling the hybrid running, the control device 122 may further add a drive torque generated by the rotating machine MG for running with the electric power from the battery 120 or may generate electric energy by rotating machine MG with the power of the engine 102 to store the generated electric power of the rotating machine MG in the battery 120. The rotating machine MG is a rotating electric machine having a function of an electric motor and a function of a generator and is a so-called motor generator. The control device 122 controls the inverter 118 to control an output torque (power running torque or regenerative torque) of the rotating machine MG.

The control device 122 has functions equivalent to the respective functions of the driving control portion 91, the AT shift control portion 92, the hybrid control portion 93, the state determining portion 94, the drive torque calculating portion 96, the remaining running distance calculating portion 97, and the destination setting portion 98 included in the electronic control device 90 of the first example described above. As with the electronic control device 90, the control device 122 can implement the control function of setting an emergency destination through automatic driving based on the state of the vehicle 100 and providing the automatic driving control based on the emergency destination when the running performance of the vehicle 100 is limited.

According to this example, the same effect as the first example described above can be obtained.

Although the examples of the present invention have been described in detail with reference to the drawings, the present invention is also applicable in other forms.

For example, in the examples described above, the emergency automatic driving to the emergency destination is performed if the running performance of the vehicle 10 is limited; however, the present invention is not limited to this form. For example, the driver may be allowed to select and set in advance whether to perform the emergency automatic driving. A program for controlling the emergency automatic driving may not be installed in the electronic control device 90, and the program may be installed in a center that is an external device and may be made usable in the vehicle 10 through communication with the center. In this case, the program capacity of the electronic control device 90 can advantageously be reduced. Additionally, in this case, the emergency automatic driving may be implemented in priority to other types of automatic driving via communication.

In the examples described above, shortage or running out of fuel such as gasoline, an insufficient state-of-charge value SOC, etc. may be included as the case of the running performance of the vehicle 10 limited as compared to original performance.

In the first example described above, the continuously variable transmission portion 18 may be a transmission mechanism which includes a clutch and/or a brake coupled to a rotating element of the differential mechanism 32 and of which differential action may be limited by control of the clutch or the brake. The differential mechanism 32 may be a double pinion type planetary gear device. The differential mechanism 32 may be a differential mechanism having multiple planetary gear devices coupled to each other and thus four or more rotating elements since multiple planetary gear devices are coupled to each another. The differential mechanism 32 may be a differential gear device in which the first rotating machine MG1 and the intermediate transmitting member 30 are respectively coupled to a pinion rotationally driven by the engine 14 and a pair of bevel gears meshing with the pinion. The differential mechanism 32 may be a mechanism having a configuration in which two or more planetary gear devices are mutually coupled by some rotating elements constituting the devices such that an engine, a rotating machine, and drive wheels are respectively coupled to the rotating elements of the planetary gear devices.

In the second example described above, the vehicle 100 may be a vehicle having the engine 102 and the rotating machine MG directly coupled to the input side of the torque converter 108 without including the clutch K0. The vehicle 100 may include at least one of the engine 102 and the rotating machine MG as a power source. Although the torque converter 108 is used as a fluid transmission device in the vehicle 100, another fluid transmission device such as a fluid coupling without a torque amplification effect may be used. The torque converter 108 may not necessarily be disposed or may be replaced with a simple clutch.

In the first and second examples described above, the composite transmission 40 and the automatic transmission 110 are illustrated as the transmission disposed in the power transmission device transmitting the power of the power source to the drive wheels; however, the present invention is not limited to this form. For example, the transmission may be an electric continuously variable transmission like the continuously variable transmission portion 18 or may be an automatic transmission such as a synchronous meshing type parallel two-shaft automatic transmission, a known DCT (dual clutch transmission) that is the synchronous meshing type parallel two-shaft automatic transmission including two systems of input shafts, and a known mechanical continuously variable transmission such as a belt type continuously variable transmission. In a vehicle in which only a power of a rotating machine driven by electric power generated by an engine and/or electric power supplied from a battery is transmitted to drive wheels via a power transmission device, the power transmission device may not include a transmission. In short, the present invention can be applied to any vehicle including a power source and a power transmission device transmitting the power of the power source to the drive wheels.

The above description is merely an embodiment and the present invention can be implemented in variously modified and improved forms based on the knowledge of those skilled in the art.

REFERENCE SIGNS LIST

10: vehicle
12: power transmission device
14: engine (power source)
28: drive wheels
90: electronic control device (control device)
91: driving control portion
94: state determining portion
96: drive torque calculating portion
97: remaining running distance calculating portion
98: destination setting portion
MG2: second rotating machine (power source)
100: vehicle
102: engine (power source)
104: power transmission device
116: drive wheels
122: control device
MG: rotating machine (power source)

What is claimed is:

1. A control device of a vehicle including a power source and a power transmission device transmitting a power of the power source to drive wheels, the control device comprising:
 a controller that is configured to:
  determine whether a vehicle state is a state in which a running performance of the vehicle is limited;
  calculate a drive torque as a maximum drive torque which the vehicle outputs based on the vehicle state;
  calculate a remaining distance as a maximum distance for which the vehicle travels based on the vehicle state;
  set a destination of the vehicle based on the drive torque and the remaining distance; and
  provide an automatic driving control in which acceleration/deceleration and steering are automatically performed based on the destination when it is determined that the vehicle is in a state in which the running performance thereof is limited.

2. The control device of the vehicle according to claim 1, wherein the power source includes an engine and a rotating machine, and the controller is configured to provide the automatic driving control using at least one of the engine and the rotating machine based on the vehicle state.

3. The control device of the vehicle according to claim 1, wherein the controller is configured to set the destination based on a type of a road on which the vehicle is currently running.

4. The control device of the vehicle according to claim 3, wherein the controller is configured to set the destination such that the vehicle runs to the destination on a road other than an expressway rather than on the expressway.

5. The control device of the vehicle according to claim 1, wherein the controller is configured to set a place having high priority as the destination among predefined prioritized places.

6. The control device of the vehicle according to claim 5, wherein the controller is configured to consider a predefined place for repairing the vehicle as the place having the highest priority when the controller sets the destination.

7. The control device of the vehicle according to claim 1, wherein the controller is configured to provide the automatic driving control by controlling the power transmission device based on a type of a road on which the vehicle is currently running.

8. The control device of the vehicle according to claim 1, wherein the controller is configured to provide the automatic driving control by controlling the power transmission device based on a type of a road in a route to the destination.

\* \* \* \* \*